United States Patent

[11] 3,561,540

[72] Inventor Anatol Kaszkurewicz
3341 Carol Ave., Baton Rouge, La. 70806
[21] Appl. No 721,475
[22] Filed Apr. 15, 1968
[45] Patented Feb. 9, 1971

[54] DEVICE FOR PLANTING TREES OR THE LIKE
13 Claims, 7 Drawing Figs.
[52] U.S. Cl. .................................................. 172/111, 111/1
[51] Int. Cl. .................................................. A01b 33/06
[50] Field of Search ................................... 172/59, 111, 522, 523, 776, 124; 111/1; 299/41; 175/404, 285; 37/65, 68, 67, 76, 142.5; 214/10.5; 47/1

[56] References Cited
UNITED STATES PATENTS
| 628,100 | 7/1899 | Labelle | 111/1 |
| 2,002,748 | 5/1935 | Neveling | 37/65 |
| 2,635,566 | 4/1953 | Heekin | 111/1 |
| 2,873,808 | 2/1959 | Rome | 172/524 |
| 3,054,461 | 9/1962 | Maguire | 172/123X |
| 1,887,387 | 11/1932 | Wright | 47/1 |

FOREIGN PATENTS
| 72,299 | 3/1951 | Denmark | 172/523 |
| 1,048,059 | 12/1958 | Germany | 172/111 |

Primary Examiner—Robert E. Bagwill
Assistant Examiner—Alan E. Kopecki

ABSTRACT: A device for planting cuttings, seedlings, or the like is described. The configuration of the device is such that soil in an annular region about the item to be planted is caused to move centripetally into an excavation containing the item to be planted. At the same time an annular trench is created in the soil around the periphery of the planted item. Methods of conducting the planting operation are also described. Among the advantages of the invention are that it reduces the time and manpower otherwise required for conducting large-scale planting operations on a forestry preserve or the like, and that planted items exhibit increased survival and growth rates.

PATENTED FEB 9 1971
3,561,540
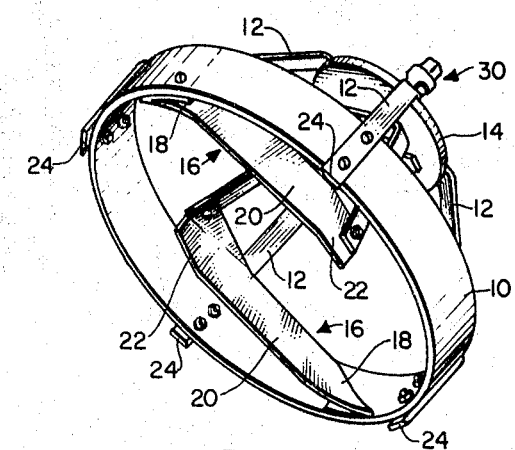
FIG. 1.
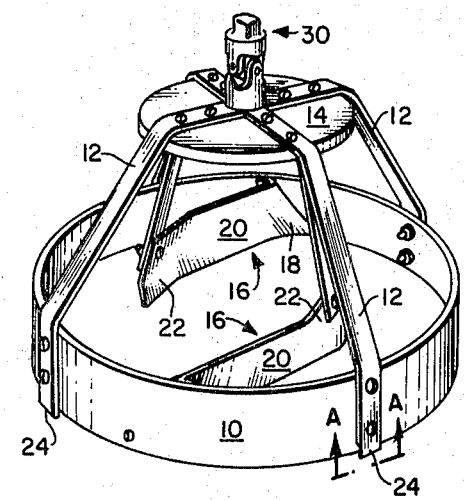
FIG. 2.
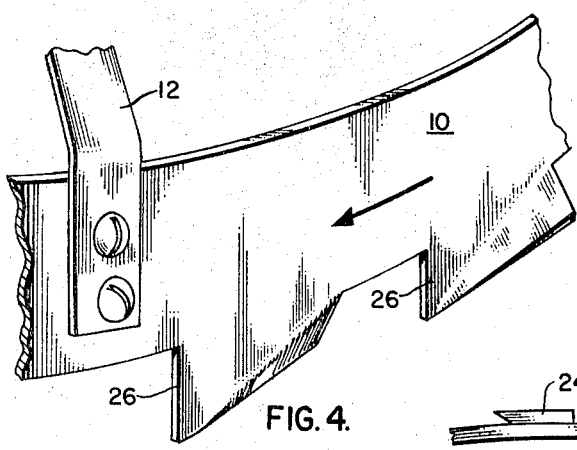
FIG. 4.
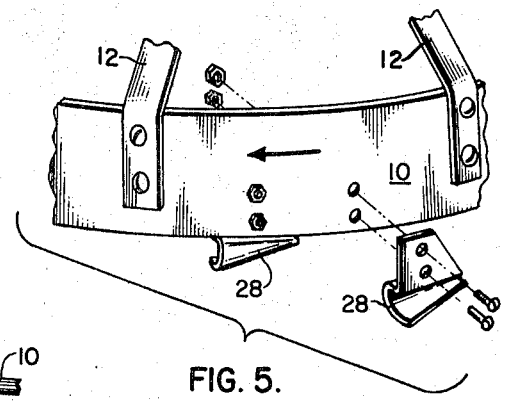
FIG. 5.
FIG. 3.
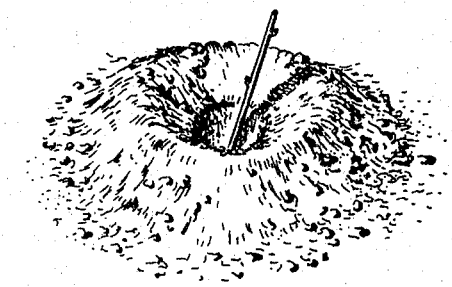
FIG. 6.
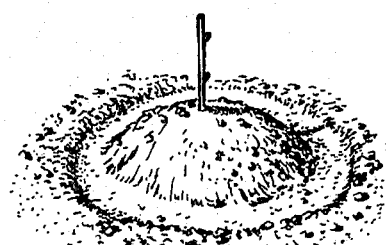
FIG. 7.
INVENTOR.
ANATOL KASZKUREWICZ
BY John F. Liebert
ATTORNEY

DEVICE FOR PLANTING TREES OR THE LIKE

This invention relates in general to controlled centripetal movement of earth particles, as in a planting operation or the like. More particularly, this invention relates to apparatus adapted, inter alia, to effect such movement in connection with the planting of cuttings, seedlings, or the like. This invention also relates in particular to improved methods for planting cuttings, seedlings, and like items whereby various tangible advantages are realized.

As is well known, various species of plant life are grown from cuttings or seedlings. For example, a commonly practiced method of establishing poplar plantations involves planting 20-inch-long cuttings in 16-inch-deep holes which have been previously punched in the soil with a 1-inch diameter steel bar.

Experiments with planting poplar seedlings or 40-inch long cuttings in mixed soil in holes 3 feet deep and 9 or more inches in diameter, have shown a consistent improvement in survival, and a significant improvement in growth rate of the planted trees. It has also been found that other species of plant life exhibit increased survival and growth rates when seedlings or cuttings thereof are planted in suitably sized holes filled with mixed soil. For further details of some of my research in this connection, reference may be had to Louisiana Agriculture Volume 7, No. 3, pages 6—7 (1964); Louisiana Agriculture Volume 10, No. 3, pages 6—7 (1967); and L.S.U. Forestry Note No. 72 (1967).

In order to take advantage of these discoveries, the planting operation would involve three essential steps, drilling appropriately sized holes, putting the suitably sized cuttings or seedlings into the holes, and refilling the holes with the soil. By virtue of the availability of mechanical hole diggers the first step of this operation poses no particular problem even when conducted on a large scale basis. However, the third step necessitated the discovery of means for its mechanical execution, if done manually, especially on large plantations, orchards or farms, the step of refilling the holes would be prohibitively expensive and time consuming.

In accordance with one aspect of this invention, apparatus is provided for effecting centripetal movement of soil from the periphery of a circular area inward within a smaller circular area. Another aspect of this invention involves a process for planting cuttings, seedlings or the like which comprises inserting the item to be planted into a generally cylindrical hole of suitable depth, and thereafter, forcing soil centripetally into the hole from an annular locus surrounding the hole while essentially simultaneously creating in the soil an annular trench about the planted item.

These and other aspects, features, embodiments, advantages and characteristics of this invention will become apparent from the ensuing description, appended claims and accompanying drawing in which:

FIG. 1 is a perspective view of the underside of a preferred soil moving device of this invention;

FIG. 2 is a view in perspective of the top and side of the device depicted in FIG. 1; 1;

FIG. 3 is an expanded (i.e., enlarged) fragmentary view of the underside of the device of FIG. 2 taken at section A,A thereof and further illustrates one suitable cutter blade arrangement which has been utilized in actual practice;

FIG. 4 is a fragmentary expanded view illustrating a preferred cutter blade arrangement which may be employed with a device depicted for example in FIGS. 1 and 2;

FIG. 5 is a fragmentary expanded view illustrating a typical alternate preferred cutter blade arrangement which may be associated with the devices of this invention;

FIG. 6 depicts in perspective view a typical arrangement of excavated soil about the rim of a hole containing a cutting and thus depicts the status of the planting operation as it exists prior to employing a device of this invention such as illustrated for example in FIGS. 1 and 2; and FIG. 7 depicts in perspective view a typical arrangement of the soil about a cutting as it exists after employing in the planting operation a device of this invention such as illustrated for example in FIGS. 1 and 2.

As even a casual inspection of FIGS. 1 and 2 will reveal, this invention in its mechanical aspects involves a device comprising a ring or cylinder and means positioned therein to cause centripetal movement of earth particles confined within the periphery of the ring or cylinder. From the standpoints of simplicity and cost, these means are preferably one or a plurality of suitably shaped and positioned blades supported in fixed, nonmoveable relationship relative to the ring so that the entire device may be axially rotated as a unit. However, if desired, the ring may contain suitably positioned discs or other moveable elements for causing centripetal movement of the soil inwardly into the central circular area through which no portion of the device passes.

Thus in essence this invention provides in its mechanical aspects an apparatus or device for moving soil, earth, or the like which comprises a ring and means positioned within the ring which are adapted to cause centripetal movement of earth particles confined within the periphery of the ring. For best results these means are additionally adapted to form an annular trench in the soil within the periphery of the ring. As illustrated by FIGS. 3, 4 and 5, the devices of this invention will, in preferred form, include cutter means associated with the ring which are adapted to facilitate axial penetration of the ring into the soil. The desired centripetal movement of the confined earth particles the essentially concurrent axial penetration of the ring into the soil are most readily effected by rotating the entire device about its axis while keeping the lower portion of the device in contact with the soil.

Referring now more particularly to FIGS. 1 and 2 in which different views of the same elements carry the same numerical legends, the preferred device involves hollow cylinder 10, a plurality of braces 12 extending upwardly and inwardly therefrom, the braces in turn being affixed to a plate or disc 14. Disc 14 preferably has a diameter less than the diameter of cylinder 10 and is held in superposed, horizontal, axial alignment relative to cylinder 10 by braces 12. The relative sizes and proportions of these elements may be varied to a considerable extent the principal considerations being to insure that the diameter of cylinder 10 is sufficient for the particular planting or earth moving operation being conducted and that braces 12 are sufficiently long as to permit the cylinder to rotatably penetrate the soil to the desired extent without at the same time encountering damaging contact between the top of the cutting or seedling and disc 14 or parts associated therewith. Supported within the periphery of cylinder 10 is a pair of spaced-apart blades indicated generally by the numeral 16. Each such blade has an arcuate outer section 18 having a sharper curvature than the curvature of cylinder 10 and thus, to a limited extent, spiraling inwardly therefrom. Section 18, of each blade in turn leads to an essentially straight intermediate section 20 which in turn leads to an inwardly bending inner section 22. It will thus be readily apparent that in the preferred arrangement depicted in FIGS. 1 and 2 the blades are positioned such that static rotation of cylinder 10—i.e., rotation of the cylinder without motion upwardly or downwardly—about its axis by about 180° causes each blade to occupy essentially the same spatial position as that formerly occupied by the other blade. In addition, the blades are positioned such that static rotation of the cylinder through 360° causes each blade to travel through essentially the same annular path about that axis. Consequently, during rotation the blades circumscribe a circular, concentric, interior area through which the blades do not pass.

It will thus be appreciated that blades 16 are adapted to deflect soil centripetally into the circular, concentric, interior area as the device is rotated about its axis in contact with the soil. In addition, the blades are adapted to form an annular trench in the soil as the device is caused to rotatably penetrate the soil.

The preferred device of this invention possesses cutter blades associated with the ring or cylinder for facilitating axial penetration of the ring or cylinder into the soil. Thus, in the form depicted in FIGS. 1, 2 and 3 the cutter blades 24 comprise downwardly projecting extensions of braces 12 and are provided with sharpened edges for cutting into the earth during rotation of the device. It cutting be understood however that these cutter blades may be of various other types and configurations. By way of example, FIG. 4 depicts a preferred variant wherein the lower portion of cylinder 10 in integrally provided with a plurality of serrations 26 which serve the same basic function of facilitating axial penetration of cylinder 10 into the soil as the entire device is rotatably pressed upon the surface of the soil. For best results, serrations 26 will have a portion of their rearward planes deflected inwardly or outwardly so that during rotation of the device during the soil penetration operation there is formed in the soil an annular incision of ample width to accommodate the cylinder, the braces, and the means for fastening these together. It will thus be seen from FIG. 4 that the planes of the serrations are bent inwardly or outwardly at their rearward portions relative to the intended direction of this rotation as depicted by the arrow shown thereon. As further shown by FIG. 4, it is convenient to alternate the direction of this bending or deflection from one serration to the next.

Another preferred cutter blade assembly is depicted in FIG. 5. In this instance the cutter blades 28 are detachably attachable to cylinder 10, this being accomplished by means of nuts and bolts (as shown), machine screws, or the like. A particular advantage for such detachable attachment is that it enables cylinder 10 to be fabricated from suitable, low cost metals or the like which do not necessarily possess the abrasion resistance and other durability characteristics which may be needed in the cutter blades themselves. In short the cutter blades may be made from tough, durable, high quality metals in order to withstand the rigors of prolonged and repeated cutting usage in abrasive or tightly compacted soils whereas the cylinder itself may be made from cheaper materials of construction having sufficient strength and durability for performing its functions in the device. Another advantage of this construction is that it permits interchange of variously shaped and sized cutter blades in order to best adapt the device for the particular type of soil or terrain upon which it is to operate. In the form depicted in FIG. 5, each cutter blade defines within its curvature essentially one longitudinal half of a frustoconical section, the largest radius of which confronts the intended direction in which the device is to be rotated during the soil penetration operation. Thus, the taper of cutter blades 28 diminishes in the direction opposite to the direction of cylinder rotation as represented by the arrow shown thereon in FIG. 5.

The preferred devices of this invention also include means associated therewith for attaching the device to a power source capable of raising, lowering, and rotating the device. Such means are depicted generally in FIGS. 1 and 2 by the numeral 20. As depicted, element 30 is in essence both a universal joint and a mechanism for coupling or clamping the device to a shaft (not shown) which in turn may be actuated by any suitable power source. Although it is not necessary to employ a universal joint in this coupling mechanism, it is desireable to do so because this enables the device to remain suspended in a generally horizontal plane even when utilized on a vehicle standing on sloped terrain. This in turn makes it possible to cause essentially vertical penetration of the device into the soil so that the essentially simultaneously formed annular trench (note FIG. 7) will be horizontal or at least nearly horizontal despite the slope in the terrain. Rain water or the like will thus tend to be distributed more or less uniformly about the planted item.

A variety of power sources may be employed for actuating the earth moving devices of this invention. For example, a device such as depicted in FIGS. 1 and 2 may be associated with tractors or other similar vehicles having suitable power takeoff mechanisms both for raising and lowering the device and for causing its rotation in the appropriate soil-penetrating direction (clockwise when viewing from above the device depicted in FIG. 2). Indeed it is entirely feasible to use the apparatus of this invention in association with ambulatory earth boring equipment having suitable supporting and actuating mechanism for use with the present apparatus. For example, the ambulatory vehicle may be equipped with a conventional auger on its front end and hydraulically operated means at its rearward end for raising and lowering the device of this invention relative to the previously bored holes. Through a suitable power takeoff mechanism the device of this invention may be caused to rotate about its axis as desired in order to effect the centripetal movement of earth particles as described above.

While the devices of this invention are most readily utilized with suitable ambulatory vehicles such as tractors, earth borers or the like, it is entirely feasible to equip the present device with a small internal combustion engine or electric motor of sufficient power to enable rotatable penetration of the device into the soil being operated upon. Further, the device may be rotatably suspended within a roller or ball bearing mechanism which in turn is affixed to a pair of handle bars or the like so that the device may be raised and lowered by hand and rotation thereof within the roller bearing mechanism caused by means of the internal combustion engine or electric motor. Other ways of actuating the device of this invention will now become readily apparent to those skilled in the art.

As noted above, the apparatus of this invention normally involves a ring or cylinder capable of rotatably penetrating into the soil and means positioned within the ring or cylinder adapted to cause, as the ring is rotated about its axis, centripetal movement of earth particles confined within the periphery of the ring. Such means may be a single blade such as blade 16, a pair of such blades (a preferred embodiment), three or more such blades (preferably positioned at essentially equal angular intervals within the ring), or other equivalent means for effecting the same result. In constructing the ring or cylinder it is desirable to utilize structurally strong material (e.g., iron alloys, or the like) so that the ring or cylinder itself may be somewhat attenuated. In this way, the necessary structural strength is provided and yet the ring or cylinder is capable of readily penetrating into the soil on rotation of the device. A feature of this ring or cylinder is that it provides a stabilizing influence upon the overall device. More particularly, as the ring is caused to rotatably penetrate the soil, the overall device is in effect anchored into the soil in the sense that it does not tend to undergo excessive ambulatory motion. Moreover, the ring causes confinement of the earth particles about the periphery of the previously provided hole so that as the entire device is rotated or the blades or other suitable means for effecting centripetal movement of earth particles are actuated, the confined soil is caused to move in the desired direction, i.e., centripetally relative to the ring.

As brought out above, the preferred devices of this invention are provided with a pair of spaced-apart blades projecting inwardly and generally horizontally from the periphery of the cylinder. These blades preferably have an essentially, straight downwardly disposed sharpened edge intermediate the ends thereof (see section 20 as depicted in FIGS. 1 and 2). In this way, the blades are capable of scraping or otherwise dislodging compacted earth from within the periphery of the cylinder. In constructing the blades, use should be made of materials which are quite strong and durable (e.g., iron alloys, steels or the like) because the blades are designed to effect centripetal movement of earth particles upon Such contact or impact of the blades with the soil and may come in contact with tightly compacted earth, stones, roots or the like. When utilizing a pair of such blades it is desirable that they project inwardly and generally horizontally from opposite sides of the cylinder as this arrangement affords symmetry and balance to the entire rotatable assembly. However, if desired the blades may be positioned within any operable locus within the periphery of the cylinder or ring. The intermediate sections 20 of blades 16 are preferably disposed such that longitudinal projections thereof are essentially parallel to each other. Such arrangement has been found particularly efficacious in actual practice.

Preparatory to using the devices of this invention for the planting of seedlings, cuttings, or the like, the first preliminary step involves boring a suitably sized hole into the earth by means of an auger or related instrument. Although not essential, it is desirable that the displaced earth be in the form of an annular pile around the periphery of the hole. The second preliminary step involves placing the cutting or seedling of suitable length into the hole of suitable depth and at this stage the status of the planting operation will be generally as depicted in FIG. 6. Thereupon the device of this invention is utilized. More particularly, the device is brought into generally axial alignment with the hole and is moved downwardly so that it comes in contact with the soil. Axial rotation of the device causes the blades to force the earth particles centripetally into the hole so that the hole is filled with earth. Further downward movement of the rotating device causes the creation in the soil of an annular trench about the periphery of the planted cutting or seedling. During this operation the displaced soil is likewise moved centripetally so that a pile or mound of earth is caused to surround the planted item. Thereupon the device is raised upwardly away from the soil and the planted item, and the planting operation has been completed. A typical arrangement of the soil as it then exists is depicted in FIG. 7.

It will thus be apparent that the devices of this invention when used in a planting operation of the character described concurrently serve several purposes. In the first place the device causes refilling of the planting holes with mixed soil alone or with a mixture of soil and fertilizer about the cutting or seedling previously placed in the hole. Secondly, the device enables the weeding of an annular area about the planted cutting or seedling. Thirdly, the device essentially simultaneously creates in the soil an annular trench about the planted item to ensure retention of rain water, irrigation water, nutrient sprays, fertilizer solutions or the like.

Consequently this invention is characterized by numerous advantages. For instance, the apparatus of this invention can be fabricated at relatively low cost from readily available materials of construction For example, the elements of the devices can be unified by use of common fasteners (e.g., nuts and bolts, rivets, etc.) or by use of such techniques as welding and the like. Furthermore, the devices of this invention are easy to employ and greatly reduce the time and manpower which would otherwise be required in conducting a planting operation of the character described, especially in the case of operations involving the planting of hundreds or thousands of cuttings or the like. Moreover, this invention makes it entirely practicable to employ the planting hole techniques described for example in the publications cited hereinabove. This in turn will result in consistent and significant improvements in the rate of growth and survival of the planted items. In addition, this invention enables the weeding of the area about the planted item while at the same time providing the annular trench with all of its advantageous features.

Although this invention has been described with particular reference to the planting of seedlings, cuttings, or the like, it can be successfully employed for various other similar operations. For example, the devices of this invention can be used for the planting of seeds, tubers, or other plant forms which do not necessarily protrude from the soil as initially planted. Moreover, the devices may be utilized in any situation where it is desired to fill a preexisting hole or to force particulate matter into a central circular area, e.g., an open conduit. By way of example, the devices of this invention may be used for filling sand holes, for effecting mulching operations, for the centripetal transport of fertilizer, grain, sugar, or like materials into an open ended conduit, and for other similar purposes.

I claim:

1. A device for moving soil, earth, or the like which comprises:

a ring;

a plurality of spaced-apart blades connecting with the interior periphery of the ring and projecting inwardly and generally horizontally from the periphery of the ring to deflect soil centripetally relative to the periphery of the ring as the device is rotated about its axis in contact with the soil and also to form an annular trench in the soil as the device is caused to rotatably penetrate the soil; and the device being further characterized in that during such rotation and penetration it circumscribes a circular, concentric, interior area through which no part of the device passes.

2. The device of claim 1 further characterized in that it includes cutter means connected with said ring and (adapted to) facilitate axial penetration of the ring into the soil.

3. The device of claim 1 further characterized in that said ring is essentially an attenuated hollow cylinder and in that it has a pair of spaced-apart blades projecting inwardly and generally horizontally from the periphery of said cylinder.

4. The device of claim 1 further characterized in that each of said blades has an essentially straight, downwardly disposed sharpened edge intermediate the ends thereof.

5. The device of claim 1 further characterized in that it includes cutter blades connected with said ring for facilitating axial penetration of the ring into the soil as the ring is rotated in contact with the soil and in that it has a pair of spaced apart blades projecting inwardly and generally horizontally from the periphery of the ring.

6. The device of claim 1 further characterized:

a. in that said ring is essentially a hollow cylinder;
b. in that it has a pair of spaced apart blades connected to and projecting inwardly and generally horizontally from opposite sides of said cylinder, each of said blades having along a portion of its length an essentially straight, downwardly disposed sharpened edge;
c. in that the device includes cutter blades connected with said cylinder for facilitating axial penetration of the cylinder into the soil; and
d. in that the device includes means for attaching the device to a power source capable of actuating the same.

7. The device of claim 1 further characterized:

a. in that said ring is essentially a hollow cylinder;
b. in that it has a pair of spaced apart blades connected to and projecting inwardly and generally horizontally from opposite sides of said cylinder, each of said blades having along a portion of its length an essentially straight, downwardly disposed sharpened edge;
c. in that the device includes cutter blades connected with said cylinder for facilitating axial penetration of the cylinder into the soil;
d. in that the device includes means for attaching the device to a power source capable of actuating the same; and
e. in that the device includes means tending to keep the cylinder essentially horizontal as the device is caused to rotatably penetrate the soil.

8. The device of claim 1 connected to means for axially rotating the same.

9. A device for facilitating the planting of cuttings, seedlings, or the like which comprises:

a. an attenuated hollow cylinder;
b. a plurality of braces affixed to the cylinder at essentially equal intervals about its circumference and extending upwardly and inwardly therefrom;
c. A disc having a diameter less than the diameter of the cylinder, said disc being affixed to the upper portions of said braces and held thereby in superposed, horizontal, axial alignment relative to the cylinder: d. A pair of spaced apart blades connected to and supported within the periphery of the cylinder, each blade having
   (i) an arcuate outer section having a sharper curvature than the curvature of the cylinder and, to a limited extent, spiraling inwardly therefrom,
   (ii) an essentially straight intermediate section, and
   (iii) an inwardly bending inner section, the blades being positioned such that
       (i) static rotation of the cylinder about its axis by about 180° causes each blade to occupy essentially the same spatial position as that formerly occupied by the other blade, and (ii) static rotation of the cylinder about its axis by 360° causes each blade to travel through essentially the same annular path about said axis and to circumscribe a circular, concentric, interior area through which the blades do not pass, the blades being adapted to deflect soil centripetally into said interior area as the device is rotated about its axis in contact with the soil and also to form an annular trench in the soil as the device is caused to rotatably penetrate the soil;

e. cutter blades connected with said cylinder for facilitating axial penetration of the cylinder into the soil; and f. means associated with said disc for attaching the devices to a power source capable of raising, lowering and rotating the device.

10. The device of claim 9 further characterized in that said cutter blades are serrations depending downwardly from said cylinder and having a portion of their respective rearward planes deflected inwardly or outwardly.

11. The device of claim 9 further characterized in that said cutter blades are detachably attached to said cylinder.

12. The device of claim 9 further characterized in that it includes means tending to keep the cylinder essentially horizontal as the device is caused to rotatably penetrate the soil.

13. The device of claim 9 connected to means for axially rotating the same.

PO-1050
(5/69)

UNITED STATES PATENT OFFICE
CERTIFICATE OF CORRECTION

Patent No. 3,561,540                    Dated February 9, 1971

Inventor(s) Anatol Kaszkurewicz

It is certified that error appears in the above-identified patent and that said Letters Patent are hereby corrected as shown below:

Column 2, line 25 reads "particles the", should read -- particles and the --. Column 3, line 2 reads "It cutting be", should read -- It will be --; line 52 reads "meral 20", should read -- meral 30 --. Column 5, line 39 reads "construction For", should read -- construction. For --; line 72 reads "a ring;", should read -- a ring; and --. Column 6, line 4 reads "soil; and", should read -- soil; --; line 10 reads "and (adapted to)", should read -- and adapted to --; line 65 reads "cylinder:", should read -- cylinder; --; line 65, subparagraph "d" is not in line with other subparagraphs, and should be set off in the same fashion as subparagraphs "a", "b", "c", "e", and "f".

Signed and sealed this 8th day of June 1971.

(SEAL)
Attest:

EDWARD M. FLETCHER, JR.                 WILLIAM E. SCHUYLER, JR
Attesting Officer                       Commissioner of Patents